June 26, 1951 — F. S. ABBOTT — 2,558,329
CONTROLLED POWER OPERATED DIFFUSER
Filed Nov. 13, 1946 — 6 Sheets-Sheet 1

INVENTOR
Furman S. Abbott
BY Watson, Bristol, Johnson & Leavenworth
ATTORNEYS

June 26, 1951

F. S. ABBOTT 2,558,329

CONTROLLED POWER OPERATED DIFFUSER

Filed Nov. 13, 1946

INVENTOR
Furman S. Abbott
BY
Watson, Bristol, Johnson & Leavenworth
ATTORNEYS June 26, 1951　　　　F. S. ABBOTT　　　　2,558,329
CONTROLLED POWER OPERATED DIFFUSER
Filed Nov. 13, 1946　　　　　　　　　　6 Sheets-Sheet 5

INVENTOR
Furman S. Abbott
BY
Watson, Bristol, Johnson & Leavenworth
ATTORNEYS

Patented June 26, 1951

2,558,329

UNITED STATES PATENT OFFICE 2,558,329

CONTROLLED POWER OPERATED DIFFUSER

Furman S. Abbott, Montclair, N. J., assignor to Airkem, Inc., New York, N. Y., a corporation of New York Application November 13, 1946, Serial No. 709,451

5 Claims. (Cl. 103—53)

The present invention relates to power operated diffusers for converting liquid to vapors and entraining the latter in passing currents of gaseous medium and, more particularly, to system equipment useful as air conditioning apparatus.

A general object of the present invention is to provide such a diffuser which may be readily constructed, installed and operated on a commercial basis for effectively mixing in a vaporizer liquid vapors, e. g., air fresheners, deodorants, water vapors, etc., into gaseous medium, such as air, at a controlled rate and which is designed to be automatically operated by a source of electrical power, such as the usual lighting circuits of buildings, railway cars, ships, buses, and the like, and which is equipped with a manual control, such as a knob, for adjusting at will the number of deliveries of liquid to the vaporizer in a predetermined period of time.

A more specific object of the present invention is the provision of such diffusion equipment characterized by a pump for delivering pulses of liquid to a vaporizer and electrical pump-operating means to cause the pump effectively to so deliver a pulse of liquid each time the electrical means is energized, an automatically operated switch device for making and breaking the electrical circuit of the pump-operating means, regulator means for determining the number of times in a predetermined period the switch device will be operated, and a manual control for the regulator effectively to adjust the latter so that the number of times in a predetermined period the switch device is operated can be changed or selected at will, thereby efficiently controlling the rate of diffusion.

Another object of the present invention is to provide in such diffusion equipment timer means efficiently to limit the duration of closure of the circuit of the pump-operating means irrespective of the design and characteristic functionings of other parts of the equipment thereby assuring attainment of desired operation of the pump operator while minimizing problems of design and operation of other units and parts thereof.

A further object of the invention is the provision of structural embodiments of the apparatus which are readily constructed and permit efficient use and operation thereof.

Other objects of the invention will in part be obvious and will in part appear hereinafter.

The invention accordingly comprises the features of construction, combination of elements and arrangement of parts, which will be exemplified in the construction hereinafter set forth, and the scope of the invention will be indicated in the claims.

For a fuller understanding of the nature and objects of the invention, reference should be had to the following detailed description taken in connection with the accompanying drawings, in which.

Figure 1:
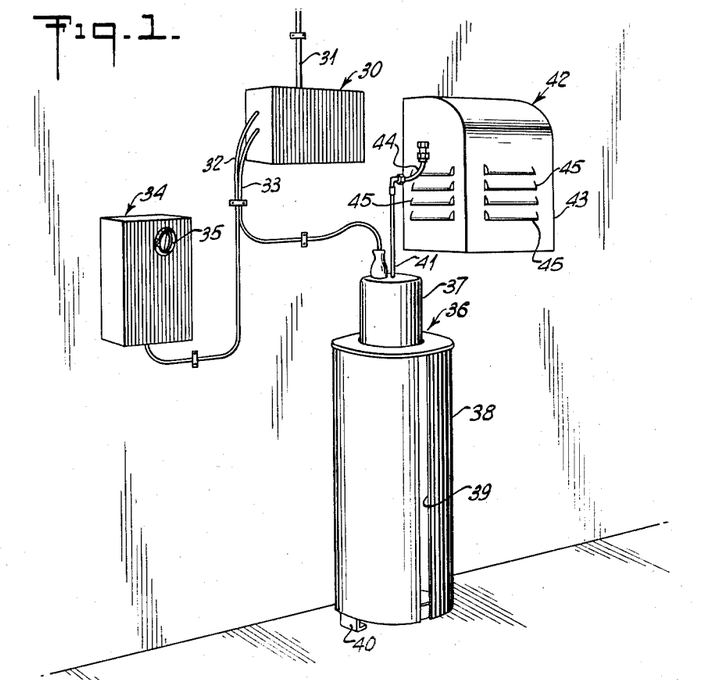
Fig. 1 is an elevational perspective of a typical installation of an embodiment of the present invention.

Referring to the drawings like numerals identify similar parts throughout and it will be seen from Fig. 1 an embodiment of the apparatus of the present invention, which is designed to diffuse vapors into surrounding atmosphere or into passing currents of air, comprises a "power center" unit 30 having an electrical cable 31 for power input connected thereto, with a three-wire cable 32 and a two-wire cable 33 leading therefrom. The embodiment of Fig. 1 also includes a second "regulator" unit 34 having a control knob 35 thereon and the three-wire cable 32 leading thereto. The third unit 36 includes a pump housing 37 and a tank housing 38 with the two-wire cable 33 leading to the pump housing. The tank housing 38, preferably of opaque sheet material, such as metal, may have a vertically extending sight slot 39 therein so that when a tank of transparent material, such as glass, is housed therein the amount of the contained quantity of liquid can readily be seen. While units 30 and 34 are adapted to be mounted on a wall or other supporting structure, the third unit 36 may be supported on the floor by means of feet 40 beneath the tank housing 38 and, if desired, such feet may be three in number. A discharge pipe 41 leads upwardly through and away from the pump housing 37. The fourth unit 42 is a "vaporizer" unit which includes a shower head within a housing 43 with the shower head connected to the pump unit by means of a conduit 44 in turn connected with the pump outlet tube 41. The housing 43 of the vaporizer 42 is provided with a plurality of louvered openings 45—45.

Figure 2:
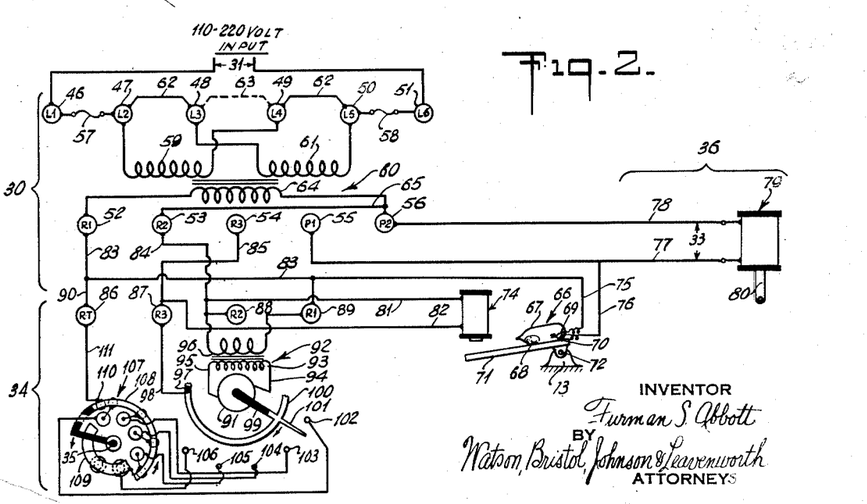
Fig. 2 is a diagrammatical showing of the electrical circuit of the embodiment shown in Fig. 1.
Figure 3:
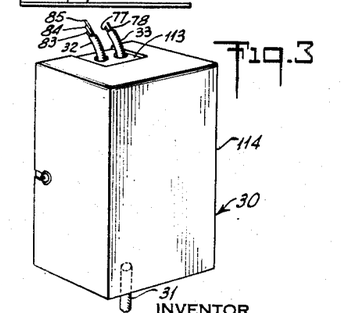
Fig. 3 is an elevational perspective, with parts broken away, of a slightly modified form to an enlarged scale of one of the units shown in Fig. 1.
Figure 4:
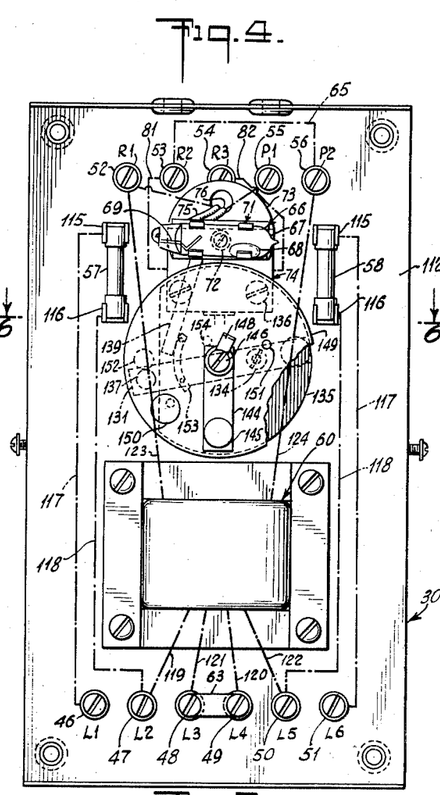
Fig. 4 is an enlarged plan view with the cover removed, and with parts broken away, of the unit shown in Fig. 3, with electrical connections between parts thereof indicated thereon in dot-dash lines, and with parts in positions of rest.

As will be seen from the wiring diagram shown in Fig. 2, the embodiment of the system shown in Fig. 1 preferably includes in the power center unit 30 two sets of terminal connectors. One of these sets of terminal connectors is identified as 46, 47, 48, 49, 50 and 51 and respectively may bear indicia "L1," "L2," "L3," "L4," "L5" and "L6." The second set of terminal elements in the power center 30 are respectively identified by numerals 52, 53, 54, 55 and 56 and respectively may bear the identifying indicia "R1," "R2," "R3," "P1" and "P2." The first set of terminal elements are the input terminal elements and, as will be seen from Fig. 2, the two wires of input cable 31 are connected to 46 and 51 ("L1" and "L6"). A fuse element 57 is connected between terminal elements 46 and 47 ("L1" and "L2") and this fuse may be of the type which permits momentary overloads without blowing, one of which is sold in the trade under the name of "Fusetron." A similar fuse element 58 is connected between terminal elements 50 and 51 ("L5" and "L6"). Terminal elements 47 and 49 ("L2" and "L4") have connected therebetween one section 59 of a split primary of a transformer 60. The other section 61 of the split transformer primary is connected between terminal elements 48 and 50 ("L3" and "L5"). Jumpers 62, 62 are provided so that with a 110 volt A.-C. power input, terminal elements 47 and 48 ("L2" and "L3") and 49 and 50 ("L4" and "L5") can be respectively connected together as shown in full lines. If the A.-C. power input is at 220 volts jumpers 62, 62 will be omitted and a jumper will be inserted at 63, as indicated in dotted lines, to connect together terminal elements 48 and 49 ("L3" and "L4").

The power center 30 includes transformer 60, the secondary winding 64 of which is connected between output terminals 52 and 56 ("R1" and "P2"). Output terminals 53 and 56 ("R2" and "P2") are connected together by a jumper wire 65. A mercury tube switch 66 is mounted in the power center 30 and may comprise an envelope or tube 67 having a body 68 of mercury therein and a pair of circuit contacts 69 and 70 adapted to be closed by the body of mercury when the tube is tilted in a direction opposite to that shown in Fig. 2, as is well known. The mercury switch tube 67 is suitably mounted upon a support 71 pivoted at 72 to a fixed support 73. The mercury tube switch 66 is tilted by means of a fixed core solenoid 74 which, when energized, may be adapted to attract upwardly the free end of the pivoted support 71 if the latter be formed of iron, or other paramagnetic material, and this solenoid is likewise mounted in the power center unit 30. Contact elements 69 and 70 of the mercury switch 66 are respectively connected by wires 75 and 76 to upper terminal elements 52 and 55 ("R1" and "P1"). Wires 77 and 78 together constitute the two-wire cable 33 and are connected between terminal elements 55 and 56 ("P1" and "P2") and the winding of a plunger core solenoid 79 having a reciprocating plunger core 80 adapted to operate a pump of the third unit 36 in housing 37. The winding of solenoid 74 is connected by wires 81 and 82 respectively to output terminal elements 53 and 54 ("R2" and "R3") so that one side will be connected through jumper wire 65 with one end of the transformer secondary winding 64, and the other end of the solenoid winding will be connected to the other end of the secondary winding through suitable wiring and a switch mechanism in the regulator unit 34. The three-wire cable 32 comprises wires 83, 84 and 85 respectively connected to output terminals 52, 53 and 54 ("R1," "R2" and "R3") of the power center unit 30. The solenoid 74 and mercury switch 66 together constitute a relay.

The regulator unit 34 includes a series of input terminal elements 86, 87, 88 and 89 respectively identified by indicia "RT," "R3," "R2" and "R1." The terminal elements 86 and 89 ("RT" and "R1") are connected together in the instrument by jumper wire 90. Output terminal 52 of the power center 30 and input terminal 89 of the regulator 34, output terminal 53 of the power center and input terminal 88 of the regulator, and output 54 of the power center and input 87 of the regulator are respectively connected together by the three wires 83, 84 and 85 of the three-wire cable 32.

The regulator unit 34 includes a series of contacts associated with a device manually operable from the control knob 35, so that a motor-operated contact means will close certain contacts in a predetermined pattern of succession so as to close the circuit of the solenoid 74 for operating the mercury tube switch 66 one or any number of the desired times for a period of operation of the regulator. For this purpose the regulator may comprise a synchronous clock motor 91 which may be operated from a step-down transformer at 60 for operating, for example, the pump solenoid 79 at reduced voltage of say 24 volts. The clock motor 91, if of the 110 volt type, may be supplied with electrical energy from transformer 60 through a step-up transformer 92, in the regulator unit, having its secondary 93 connected to the motor by wires 94 and 95. The primary winding 96 of the step-up transformer 92 has its ends respectively connected to input terminals 88 and 89 ("R2" and "R1"). A common contact is shown at 97, in the form of a fixed brush, and is connected by a wire 98 to input terminal 87 ("R3"). The clock motor 91 drives a contact closing means comprising an insulating support 99 carrying a rotatable commutator ring 100 against which brush 97 rides. Rotatable commutator ring 100 carries a switch arm 101 adapted to close the circuit of the solenoid 74 periodically at contacts 102 to 106, inclusive, once each revolution of the contact closing means for automatic purposes. The latter contacts are connected to a manual control device or switch mechanism 107 for, at will, cutting in or out of the circuit one or more of those contacts by manipulation of knob 35 which carries with it contact sectors 108 and 109, connected together, and associated with suitable brushes in a known manner. A brush 110 makes contact with sector 108 to complete the circuit by means of wire 111 connecting that brush to terminal 86 ("RT"), in turn connected by jumper 90 to input terminal 89 ("R1").

Broadly, the operation of the apparatus shown in Fig. 1 with respect to its wiring diagram, shown in Fig. 2, may with a certain setting of the control knob 35 be as follows. A.-C. power at either one hundred and ten (110) or two hundred and twenty (220) volts will be supplied through the input cable 31 of the power center unit 30 to the primary of step-down transformer 60 therein. The secondary 64 of that transformer supplies, through wire 78 and wires 77, 76, 75 and 83, A.-C. current, preferably at twenty-four (24) volts, to the pump solenoid 79 when that circuit is closed at the relay mercury switch 66. The transformer secondary 64 also supplies current from the power center unit 30 to the regulator unit 34 by jumper 65, wire 84, step-up transformer primary 96 and wire 83, so that the secondary 93 of step-up transformer 92 will supply A.-C. current at one hundred and ten (110) volts to the synchronous motor 91. The latter will rotate a contact 101 once every five minutes, or any other predetermined period of time, successively to close the control circuit including the relay comprising switch 66 and its operating solenoid 74. For example, one side of the control circuit leading to the winding of solenoid 74 is connected by wires 81 and 84 and jumper 65 to the step-down transformer secondary 64, which in turn has its other end connected through wire 83, jumper 90 and wire 111 to the control 107. If that control device is set in certain fashion, such as indicated in Fig. 2 by way of example, the other side of the control circuit leading to the winding of solenoid 74 will be connected through wires 82 and 98, fixed brush 97, commutator ring 100, rotary contact 101 and fixed contact 102 through the control device 107. The parts may be so designed that this control circuit remains closed for a period of about eight to twelve (8-12) seconds, e. g., ten (10) seconds, after which rotary contact 101 moves on toward fixed contact 103 so that after a period of about thirty-seven and a half (37.5) seconds the circuit will again be closed. In the setup shown in Fig. 2, the circuit will be closed five (5) times in one (1) rotation of rotary contact 101 and, of course, it will be understood that the control mechanism may be so constructed as to provide any desired number of successive circuit closures in one revolution of the rotary contact. For example, the control device 107 may be equipped with elements to provide for eight (8) periodic circuit makes and breaks in one (1) revolution, and any one or more of these may be cut out of the control circuit by operation of the control knob 35. As a result, in each time period, of say five (5) minutes, the solenoid 74 of the relay will be successively energized and de-energized to operate the relay mercury switch 66. The latter is preferably associated with timing structure so that there the duration of circuit closure may be carefully adjusted to a particular duration of time, for example, about two (2) seconds.

Figure 5:
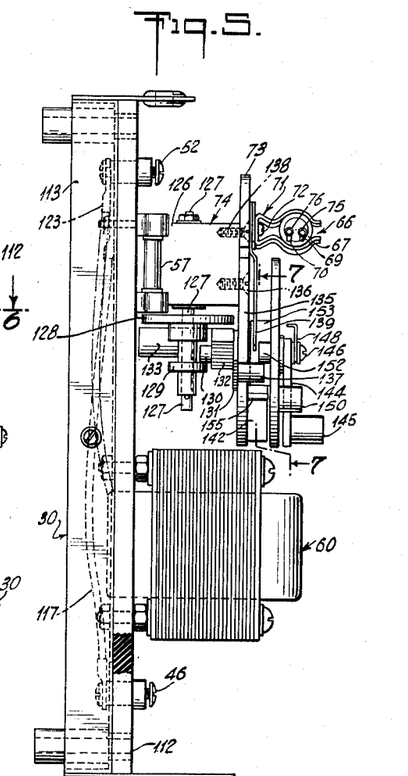
Fig. 5 is a side elevational view of the structure shown in Fig. 4.
Figure 6:
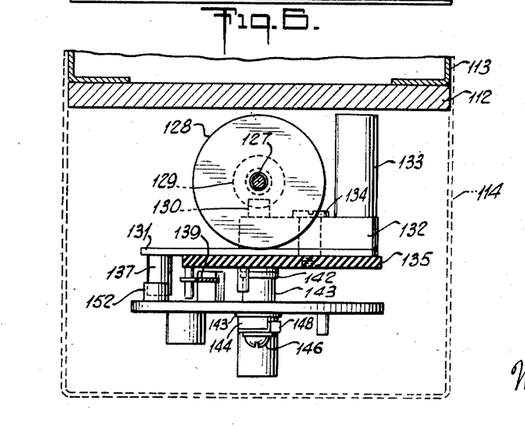
Fig. 6 is a horizontal section taken on line 6—6 of Fig. 4, with parts broken away and with the cover indicated in dotted lines.

With the setting of the control device 107 by knob 35, as proposed in Fig. 5, there will be five (5) periods of pump operator circuit closure, each of a duration of about two (2) seconds in a five (5) minute period, and during each such circuit closure the pump solenoid 79 is energized to cause the pump connected to the plunger core 80 to force a pulse of fluid upwardly through the discharge tube 41 and through conduit 44 to a shower or spray head in the vaporizer 42, there to permit passing currents of air, or other gaseous medium, to pick up sprayed liquid and vapors thereof. If the control device 107 is equipped with means to provide eight (8) circuit closures in a time period of five (5) minutes, the pump pulses can be uniformly spaced apart an equal number of seconds. If fewer pump pulses per the same period of time are desired, control knob 35 can be adjusted to cut out one or more of the control circuit-closing contacts. This, of course, will maintain the same time duration between some of the pulses and double it between two (2) of the successive pulses when one (1) of the control contacts is cut out of the control circuit, triple it when an adjacent two (2) of the control contacts are cut out, etc. The resultant non-uniformity in time duration between successive pulses is entirely satisfactory for efficient operation of the apparatus of the present invention, since the amount of liquid delivered through the spray head in a period of time is determined by the number of pulses during that period, and provision can be made in the vaporizer for temporarily storing pumped liquid in a manner to permit it to be gradually taken up by passing currents of air or other gaseous medium.

As intimated above, the power unit 30 includes a timing device adapted to foreshorten time duration of circuit closure by the control device 107 in the regulator unit 34, and that timing device is preferably associated with the relay comprising mercury switch 66 and its operating solenoid 74. The power center unit 30, as shown in Figs. 3 to 9, inclusive, may in one embodiment thereof include a base 112, preferably in the form of a plate of insulating material, such as substantially rigid plastic or synthetic resin material, e. g., Bakelite, supported upon a frame 113 to which may be removably secured a suitable cover 114. The plate 112 carries input terminal connectors 46, 47, 48, 49, 50 and 51 respectively marked "L1," "L2," "L3," "L4," "L5" and "L6." The terminal connectors 48 and 49 ("L3" and "L4") are connected together by a jumper 63.

The base plate 112 supports two sets of clips 115 and 116, with one set thereof receiving a fuse element 57 and the other set a fuse element 58, both preferably of a type which permits momentary overloads without blowing, such as Fusetrons. Suitable connecting wires 117 and 118, beneath plate 112 (indicated in dot-dash lines in Fig. 4), connect clips 115 and 116 for fuse 57 to terminal connectors 46 and 47 ("L1" and "L2") so that that fuse is bridged between those connectors. Similar wires connect fuse 58 between terminal connectors 50 and 51 ("L5" and "L6"). A step-down transformer 60 is mounted on the base plate 112 and has one of the two sections of a split primary winding connected by wires 119 and 120, beneath plate 112 (indicated in dot-dash lines in Fig. 4), to terminal connectors 48 and 50 ("L3" and "L5"). The jumper 63 is employed when terminal connectors 46 and 51 ("L1" and "L6") are to be connected to an A.-C. power source of two hundred and twenty (220) volts and, of course, if the unit is to be used on a one hundred and ten (110) volt power source, jumper 63 will be removed and similar jumpers employed to connect terminal connectors 47 and 48 ("L2" and "L3"), and 49 and 50 ("L4" and "L5").

The secondary winding of the step-down transformer 60 is connected by wires 123 and 124, beneath plate 112 (indicated in dot-dash lines in Fig. 4), to output terminal connectors 52 and 56 ("R1" and "P2"). Three other output terminal connectors 53, 54 and 55 ("R2," "R3" and "P1") are also mounted on base plate 112 with terminal connector 53 connected by a jumper 65, beneath plate 112 (indicated in dot-dash lines in Fig. 4), to output terminal connector 56 ("P2").

Solenoid 74 is mounted on the base plate 112 and has its winding 125 connected by wires 81 and 82 respectively to output terminal connectors 53 and 54 ("R2" and "R3"). In the preferred embodiment of the power center unit 30, the solenoid 74 may have an open-bottomed casing 126 of ferrous material providing part of its magnetic flux circuit which is completed by fixed core 127 and armature plate 128 slidably mounted thereon. The armature plate 128 preferably carries a spool 129 between the ends of which is located an operator lug 130 fixed to pivoted hammer arm 131, preferably by means of an intervening block 132 carrying a biasing or counterbalancing weight 133, and with the block 132 and arm 131 pivotally supported by a screw 134 on a plate 135, preferably of Bakelite or the like, fixed by screws 136 to the casing 126 of the solenoid 74. The pivoted arm 131 carries on its free end a hammer head or striker lug 137.

In the power center unit 30 the solenoid casing 126 also carries a supporting member 73, such as another plate of Bakelite, secured thereon by screws 138, with that plate pivotally supporting by means of screw 72 a mercury switch tube clip 71 having fixed thereto a tilting arm 139. The clip 71 supports tube 67 of mercury switch 66 with the tube carrying a body 68 of mercury and having therein a pair of contact members 69 and 70 adapted to be connected together electrically by the body of mercury when the switch is tilted. The contact members 69 and 70 are respectively connected by conductors 75 and 76, which extend through holes in supporting plate 73 and base plate 112 to behind the latter, to output terminal connectors 52 and 55 ("R1" and "P1") respectively.

The plate 135, supported by screws 136 on solenoid casing 126, has an internally threaded, laterally extending hole receiving the externally threaded reduced end 140 of a stub shaft 141 to support the latter. The stub shaft 141 rotatably carries a gravity-biased or weighted arm or pendulum 142 to serve as an energy-absorbing check upon impact by a moving member, a sleeve 143 and a gravity-biased return arm 144 provided with a weight 145 to serve as another energy-absorbing check. A screw 146 is threadably engaged in an internally threaded socket in the outer end of stub shaft 141 to hold members 142, 143 and 144 thereon by means of washer 147, and also fixedly to support stop bracket 148. Sleeve 143 fixedly carries an impact-receiving unbalanced member or throw disc 149 having on its outer face an eccentrically-located weight 150, and on its rear face an operator lug 152 positioned adjacent to and in the path of striker lug 137 on hammer arm 131 so that when the latter is rapidly swung upwardly by lift of solenoid armature 128, lug 137 will strike lug 152 and cause the throw disc 149 rapidly to rotate clockwise.

Figure 7:
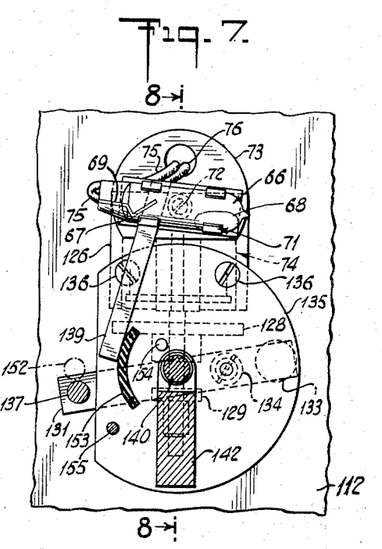
Fig. 7 is an elevational section, on an enlarged scale and with parts broken away, taken substantially on line 7—7 of Fig. 5.
Figure 8:
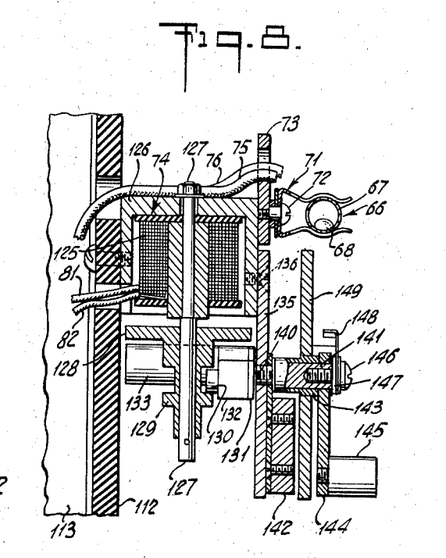
Fig. 8 is an elevational section taken substantially on line 8—8 of Fig. 7.

The throw disc 149 also carries on its outer face a pin 151 with the latter in the path of return arm 144, and on its rear face a switch arm-deviating arcuate cam member 153 of insulating material, such as Bakelite. Arcuate cam member 153 is adapted to move and hold the switch arm 139 to the left with the mercury switch 66 tilted, as shown in Fig. 7, to retain the body of mercury 68 out of circuit-closing contact with respect to terminal fingers 69 and 70, until the throw disc 149 has carried that arcuate cam member around beyond the arm 139, permitting the latter, due to the force of gravity, to swing to the right until it engages a stop pin 154 on frame plate 135.

Plate 135 also carries a stop pin 155 which limits clockwise swing of check pendulum 142. The latter is disposed in the path of the arcuate cam member 153, to serve with return arm 144 as check means for the swing of throw disc 149. The pin 151 on disc 149 is adapted, in the rotation of the latter, eventually to strike the return arm 144 to permit the latter to serve as part of the check means and so that it will be swung upwardly, until it is stopped by bracket 148, then to serve as means for returning throw disc 149.

Figure 9:
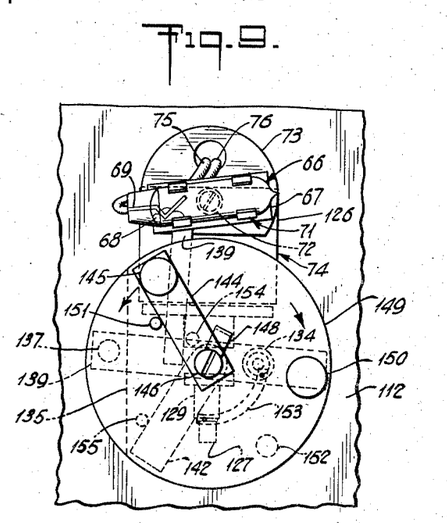
Fig. 9 is a front elevational view of the structure shown in Fig. 8, with parts in positions of throw during operation.

In operation of the mechanism of the power center unit 30 when the circuit of the solenoid winding 125 is suitably closed by switch means connected across terminal conductors 52 and 54 ("R1" and "R3"), that solenoid winding will be connected in series with the secondary of transformer 60 thereby energizing the solenoid and snapping its armature 128 upwardly. Spool 129 carried by armature 128 lifts the counter-balanced hammer arm 131 by means of its operator lug 130, causing the striker lug or hammer head 137, carried by that arm, to impact operator lug 152 on throw disc 149. As a result, throw disc 139 is rapidly rotated in a clockwise direction until its pin 151 strikes against pendulum check return arm 144 to carry the latter clockwise with it until the latter strikes against stop bracket 148. At the same time, throw disc 149 also carries with it arcuate cam member 153 away from switch tilting arm 139 with the arcuate cam member eventually striking against pendulum check 144 as a part of means for effectively bringing the throw disc to a stop. Pendulum check 142 is eventually stopped in its swinging motion by pin 155 on supporting plate 135. The relative positions of these parts prior to energization of the solenoid, is shown in Figs. 4 to 8, inclusive, and in Fig. 9 is shown the relative positions of the parts after the solenoid has been energized to cause the throw disc to be rotated clockwise, and just after the return arm 144 has struck against its stop bracket 148 and then started to fall back to its initial position by means of the force of gravity acting upon that arm and its weight 145. Return arm 144 then rotates counter-clockwise through force of gravity and, by pushing against pin 151 carried by throw disc 149, causes the latter to return to its initial position.

By proper proportioning of the mechanically operated parts of this timing device of power center unit 30, the duration of time between throw of disc 149 rotationally in a clockwise direction and its return can be quite precisely predetermined. Thus return of the parts is not materially affected by continued energization of the solenoid winding and, in fact, even though hammer arm 131 and its lug 130 be in lifted position, due to continued energization of the solenoid upon return of throw disc 149, the arcuate cam member 153 carried by the throw disc will have again been brought into contact with switch arm 139 and will have swung it again to its initial position, even though operator lug 152 on the throw disc prevents the latter from completely returning to its initial position until the solenoid is de-energized.

When the arcuate cam member 153 is carried away from the switch arm 139 by clockwise rotation of throw disc 149, the switch arm by force of gravity tilts the mercury switch clip support 71 counter-clockwise, to the position shown in Fig. 9, so that the body of mercury 68 electrically connects switch contact members 69 and 70. As a result, conductors 75 and 76 are connected together during the time that mercury switch 66 is so tilted and, since they are connected to terminal connectors 52 and 55 ("R1" and "P1"), any electrical circuit connected thereto will be closed during that period and the duration of circuit closure will be desirably and precisely timed by the described operation of that mechanical timing mechanism.

The regulator unit 34, shown in Figs. 10 to 16, inclusive, comprises a base member 156 on which is mounted a set of input terminal connectors 86 to 89, inclusive ("R1," "R2," "R3" and "RT" in reverse order) carried by a plate of insulating material 157 overlying a hole 158 in the base and fastened to the latter by rivets 159, 159. The hole 158 in the base 156 permits access to the backs of the input terminal connectors 86 to 89, inclusive, so that the wiring in the unit may be conveniently located on the back of the base. Terminal connectors 86 and 89 ("RT" and "R1") are connected together by a jumper or wire 90, indicated in dot-dash lines in Fig. 11.

Figures 10, 11, 12, 13, 14, 15, 16:
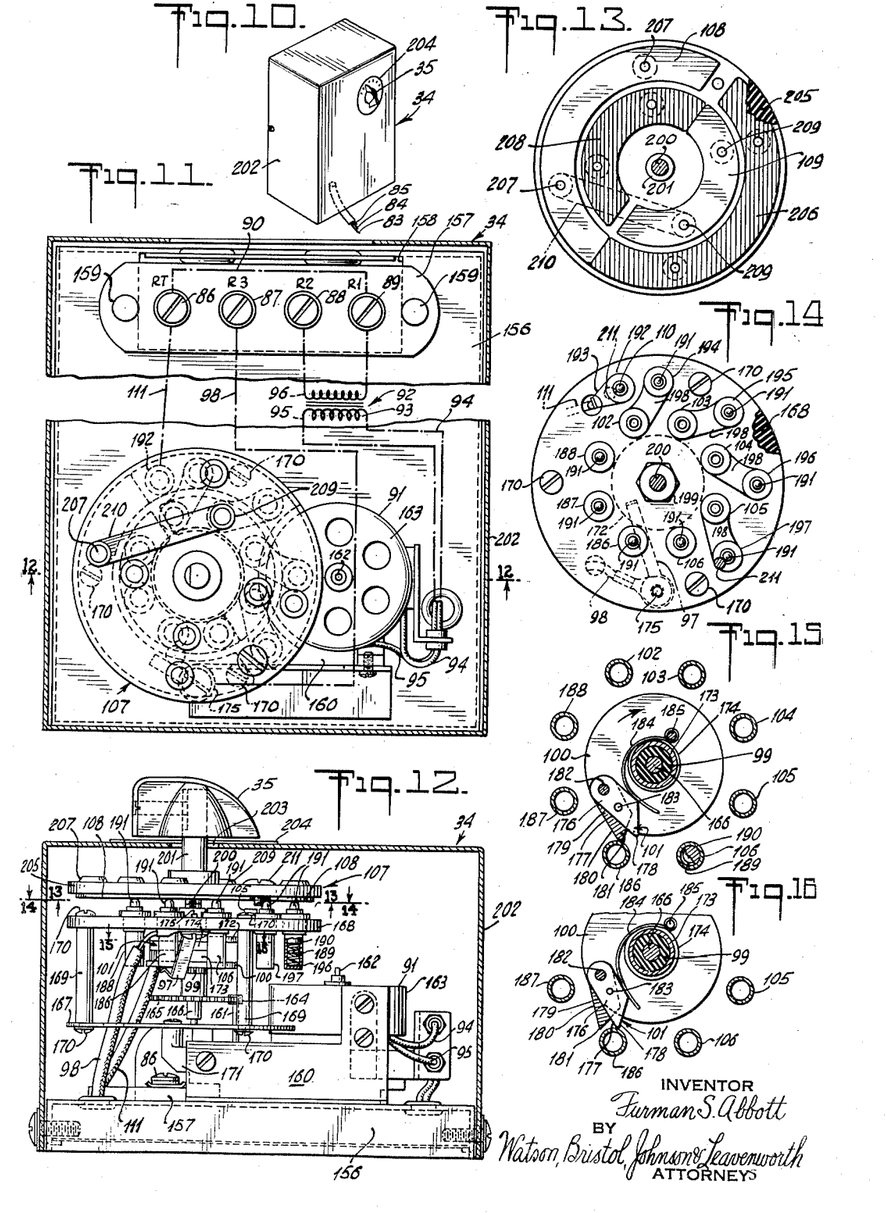
Fig. 10 is an enlarged elevational perspective of another one of the units shown in Fig. 1.
Fig. 11 is an elevational view, to an enlarged scale, with the cover sectioned to show the interior parts of the unit shown in Fig. 10 but with the latter reversed end for end, certain parts being broken away and others being diagrammatically indicated with electrical connections indicated by dot-dash lines.
Fig. 12 is a view to the same scale as Fig. 11 of the unit shown in Figs. 10 and 11, with the cover substantially sectioned at line 12—12 of Fig. 11 and with the interior elements shown in elevation as viewed from the top end of Fig. 10 and the bottom end of Fig. 11.
Fig. 13 is a sectional view taken on line 13—13 of Fig. 12, looking in the direction of the arrows, and with parts broken away and shown in section.
Fig. 14 is a sectional view taken substantially on line 14—14 of Fig. 12, looking in the direction of the arrows, and with parts broken away and shown in section.
Fig. 15 is a sectional view taken substantially on line 15—15 of Fig. 12.
Fig. 16 is a view similar to Fig. 15, but with parts broken away and other parts shown in different operative positions.

For the purpose of permitting the regulator unit 34 to be connected to a source of A.-C. power at a voltage different from that at which a synchronous clock motor 91 is rated, the base 156 preferably supports a transformer 92 diagrammatically indicated in Fig. 11. If, for example, the A.-C. power supplied to the regulator unit 34 is at twenty-four volts (24 v.) and the synchronous clock motor 91 is rated at one hundred and ten volts (110 v.), the transformer 92 is a step-up transformer with its primary winding 96 connected to input terminal connectors 88 and 89 ("R2" and "R1"). The transformer secondary 93 is connected by wires 94 and 95 to the winding of the synchronous clock motor 91.

Synchronous clock motor 91 includes a base unit 160 in which a driving shaft 161 is suitably geared to motor shaft 162 carrying rotor 163. The driving shaft 161 carries a driving pinion 164 meshed with a spur gear 165 mounted upon a rotatable shaft 166 which is rotatably supported at its ends by metallic base plate 167 and top plate 168, preferably of insulating material, such as Bakelite. Plates 167 and 168 are suitably tied together to form a fixed unit by tie rods 169—169 and anchoring screws 170—170. Control unit 107, of which plates 167 and 168 and tie rods 169—169 form the frame, is suitably supported on the synchronous clock motor base 160 by means of brackets 171, of which there may be two.

The rotatable shaft 166 carries a sleeve of insulating material 99 which supports a metallic disc of brass, or the like, 100, and a second metallic disc 172 spaced upwardly therefrom, as shown in Fig. 12, each preferably having a central sleeve, 173 and 174 respectively and preferably made integral with the discs, together to form a spool-like structure of good electrical conductivity. The spool comprising the discs 100 and 172 rotatable with shaft 166 serves as a commutator ring or structure which is electrically connected by means of brush 97, mounted on plate 168 by screw 175, which anchors thereto conductor 98, in turn anchored by screw 175 and connected to input terminal connector 87 ("R3").

The commutator spool, comprising plates 100 and 172, carries a unique contact make-and-break device 101. Preferably the contact make-and-break device 101, as shown in Figs. 15 and 16, includes a finger 176 of metallic material of good electrical conductivity, such as brass, having an outer flat surface 177 and a nose 178, and a similar finger 179 of insulating material having an outer surface 180 and a nose 181. The fingers 176 and 179 are pivotally mounted to the spool by a shaft 182 extending between discs 100 and 172, and they are angularly related to each other and fixed together, as is shown, by a pin 183 so that the outer surface 180 and the nose 181 of the insulating finger 179 are located outwardly of the outer surface 177 and the nose 178 of the conducting finger 176. Thus, if in rotation of the contact structure 101 it is dragged against an obstruction, such as a contact member, the insulating finger 179 will keep the conducting finger 176 out of contact therewith until the insulating finger is moved therebeyond. A biasing leaf spring 184 has one end fixed by a pin 185 to the spool comprising discs 100 and 172 and it is partially wrapped about the sleeve 173 of disc 172 to have its free end bear against the inner side of contact finger 176 so as to bias the noses 178 and 181 of that finger and insulating finger 179 outwardly. Both pin 183 and spring 184 may serve electrically to connect conducting finger 176 to the commutator spool.

About the contact-carrying commutator spool structure comprising discs 100 and 172 are located a plurality of depending contact members 102, 103, 104, 105, 106, 186, 187 and 188, preferably equally spaced apart and fixedly mounted in a circle on insulating plate 168. Preferably each of those contact members comprises a substantially cylindrical hollow cup of electrically-conducting metallic material, such as brass, press-fitted into a hole in the plate 168. Each of cup contacts 106, 186, 187 and 188 carries a helical spring 189 therein biasing upwardly a metallic plunger 190 which, as shown in Fig. 12, has an upwardly projecting end 191 to ride in contact with any flat structure that may be moved thereacross.

The insulating plate 168 of control device 107 also carries a terminal contact member 192 which, for simplicity in manufacturing, may be similar to any of the contact members 106, 186, 187 and 188, and which is provided with a spring-biased upwardly projecting contact rider 110. Contact member 192 anchors a terminal clip 193 which is electrically connected to wire 111 in turn connected to input terminal connector 86 ("RT"), and through jumper 90 to input terminal connector 89 ("R1"). Insulating plate 168 also carries additional contact members 194, 195, 196 and 197 in an arc beyond the inner circle of contact members 102 to 105, inclusive, and 186 to 188, inclusive, as shown in Fig. 14, and those contact members 194 to 197, inclusive, are also preferably similar to 106 et seq., with each having an upwardly extending spring-biased contact rider 191. Contact member 194 is connected to contact member 102 by a metallic strap 198 on plate 168 and in similar fashion contact members 195 and 103, 196 and 104, and 197 and 105 are respectively connected together.

The insulating plate 168 of control device 107 also has axially thereof a hole extending therethrough and a screw 199 is threadably anchored in the hole, with bottom end of screw 199 socketed to serve as a top bearing for shaft 166. Screw 199 has an upwardly extending, externally threaded, extension 200 on which is threadably mounted an internally threaded cup 201 to serve as a shaft for control knob 35. Cover 202, removably secured to the base 156, has a hole 203 therein through which shaft 201 extends to receive beyond the cover the control knob 35, preferably in the shape of a pointer to cooperate with a dial 204 mounted on the exterior of the cover about shaft 201.

The internally threaded cup 201, serving as a control knob shaft, has fixed thereto a disc 205 of insulating material, such as Bakelite. On the under side of insulating disc 205 is mounted a substantially semi-circular, arcuate contact plate 108 of electrically conducting material, such as brass, and a similar semi-circular plate 206 of insulating material. Preferably contact plate 108 is anchored to insulating disc 205 by rivets 207, 207 and similar rivets secure insulating plate 206 to insulating disc 205. Radially inwardly of semi-circular plates 108 and 206 are located two additional semi-circular, arcuate plates 109 and 208, with the former being formed of electrically conducting metallic material and the latter being formed of insulating material. Inner semi-circular plate 109 is preferably secured to insulating disc 205 by rivets 209, 209 and contact plate 109 is electrically connected to contact plate 108 by a metallic strap 210 anchored at its ends by rivets 207 and 209, with the strap being preferably arranged on the top side of insulating disc 205, as shown in Figs. 11 and 13.

With the internally threaded shaft cup 201 threadably mounted on the externally threaded extension 200, the insulating disc 205 may be rotated by control knob 35, and telescoping of the spring-biased contact riders 191—191 into their cup contacts will permit downward movement of disc 205 as the control knob 35 is rotated clockwise and, conversely, upward as the control knob is rotated counter-clockwise, with the contact riders always assuring efficient physical contact with the rotated contact plates 108 and 109. Rotary movement of insulating plate 205 is limited by a stop screw 211 which, as shown in Figs. 12 and 14, has its lower end projecting downwardly so as to strike against the rider 110 of contact member 192 when plate 205 is rotated clockwise, and to strike against rider 191 of contact member 197 when plate 205 is rotated counter-clockwise.

In operation of the regulator 34, shown in Figs. 10 to 16, inclusive, when the control knob 35 is set with stop screw 211 jammed against rider 191 of contact member 197, the terminal contact rider 110 is in contact with insulating arcuate plate 206 and the circuit is open. However, if insulating disc 205 be rotated clockwise by control knob 35 so that stop screw 211 jams against rider 110, the latter will be in electrical contact with arcuate plate 108 near its trailing end and with riders 191 of contact members 194, 195, 196 and 197, also all in contact with arcuate plate 108. Since contact members 102, 103, 104 and 105 are all respectively strap-connected to contact members 194, 195, 196 and 197, those four contact members will be "alive" or connected in circuit with wire 111 and in parallel with each other. In this latter position of control knob 35 and disc 205, arcuate contact plate 109 is also in contact with riders 191 of inner contact members 106, 186, 187 and 188. Since arcuate contact plate 109 is electrically connected to arcuate contact plate 108 by strap 210, it will thus be seen that these latter four inner contact members are also "alive" and connected in parallel with each other and with the other four inner contact members.

Power may be supplied by input terminal connectors 88 and 89 ("R2" and "R1") through transformer 92 to the synchronous clock motor 91 so that it will rotate, by pinion 164 and spur gear 165, the shaft 166 so as to carry therewith the commutator spool comprising plates 190 and 172. By selecting proper gear ratios for the gearing in motor base 160 and for pinion 164 and spur gear 165, the commutator structure may be caused to rotate slowly at any selected rate of speed, for example rotate one (1) revolution in five (5) minutes. As the commutator structure slowly rotates the outer face 180 of insulating finger 179 will engage against one of the inner contact members, such as 186, holding conducting contact finger 176 out of contact therewith. With continued rotation of the commutator structure, its unique contact structure 101 will be brought to the position shown in Fig. 15 and then the nose 181 of insulating finger 179 will slip past contact member 186 to permit the outer surface 177 of conducting finger 176 to be snapped to contact with contact member 186, as shown in Fig. 16, by virtue of the spring biasing of the contact structure 101 by spring 184. Further rotation of the commutator structure will eventually drag the nose 178 of conducting finger 176 past contact member 186 quickly to break the circuit.

With still further rotation of the commutator structure the operation will be repeated with respect to contact member 187 and the other inner contact members there following in successive order, so that any circuit connected to wires 111 and 98 by input terminal connectors 86 ("RT") or 89 ("R1") and 87 ("R3") will be periodically closed and opened. Since there are in the embodiment of regulator unit 34, shown in Figs. 10 to 16, inclusive, eight inner contact members, it will be understood that in one revolution of the commutator structure in a period of five (5) minutes there is an interval between two successive contact members of thirty-seven and a half (37.5) seconds. The unique contact structure 101 on the commutator structure not only assures snap action of the contact finger 176 to provide quick make-and-break, but also reduces the period of make effectively to a few seconds, for example, about ten (10) seconds.

It will be understood that when the control knob 35 is rotated counter-clockwise from the position with stop pin 211 jammed against rider 119, the inner contact members will be successively cut out of circuit. For example, first outer contact member 197 and its inner contact member 105 will be cut out of circuit; thereafter contact member 188 will be cut out of circuit, and then outer contact member 196 with its inner contact member 104 will be cut out. With continued counter-clockwise rotation of plate 168 by control knob 35, the contacts are successively cut out of circuit with an alternation between outer contacts 197, 196, 195 and 194 and inner contacts 188, 187, 186 and 106. Of course it is understood that when any one of the contact members is cut out of circuit the period of circuit make-and-break is increased between the two contacts on either side thereof which still remain in circuit, and if two adjacent contact members are removed from circuit the period between circuit make-and-break accomplished by the contact members on opposite sides of the two cut out of circuit will be doubled, etc. As a result, although the number of circuit closures per period of one revolution of the commutator structure may be selectively reduced or increased, the time intervals are not uniform. This, however, is entirely acceptable for many services wherein the two characteristics desired are a certain number of circuit closures in a certain period with each circuit closure being of a definite duration.

In the pump unit 36 shown in Figs. 17 to 22, inclusive, there is preferably provided a pump supporting plate 212 on which a bracket 213 is fixed. A yoke 214 is secured to bracket 213 by any suitable means, such as screws 215, 215. The yoke 214 supports a solenoid 79, winding 216 of which is connected to circuit conductors 77 and 78 so that when power is supplied therethrough the solenoid will be energized. Solenoid 79 is of the plunger core type having plunger 80 adapted to be lifted when the solenoid is energized. A bumper 217, preferably in the form of a rubber block, is mounted on the base plate 212 beneath the plunger core 80 to assure quiet operation.

Pump bracket 213 also supports outlet tube 41 which extends downwardly for access to liquid, such as body 218 in a container 219 on which pump base plate 212 may rest and be secured thereto by a cap ring 220. The bottom end of tube 41 is preferably reduced in section at 221 to receive thereon a hollow piston 222 which may be soldered or brazed in position. The hollow piston 222 is provided with an end wall 223 having an axially located inlet hole 224. The inlet hole 224 is valved, preferably by a ball 225 seating down against the end wall 223 to close off the hole 224. A helical biasing spring 226 is held under stress between the reduced end section 221 of tube 41 and the ball 225.

A pump cylinder 227 is closely fitted about piston 222 for relative sliding movement. The lower end of pump cylinder 227 is fitted with a head block 228 having an axial inlet hole 229 therein closed off by a gravity-biased check valve ball 230. The head block 228 is held in position in the lower end of cylinder sleeve 227 by means of a screen 231 which seats against a circular shoulder 232 in the cylinder sleeve with the edge 233 of the cylinder sleeve crimped inwardly to hold the screen in position. The cylinder sleeve 227 is to be reciprocated up and down relative to the hollow piston 222, and for this purpose a vertical rod or pull wire 234 has its upper end bent laterally at 235 to be received in a transverse hole in the plunger core 80. The pump operating wire or rod 234 is provided at its lower end with a clip 236 which is mounted in a circumferential groove 237 in the external surface of cylinder sleeve 227 by snap engagement.

Preferably pump housing 37 is mounted on supporting base 212 and the container 219 is provided with a cover 38 having a vertical sight slot 39 therein and a plurality of supporting feet 40—40 having lateral extensions 238—238 to support the bottom of the container 219. A cover plate 239 is provided for the casing 38 and has a hole 240 therein which receives the pump housing 37.

Figures 17, 18, 19, 20, 21, 22:
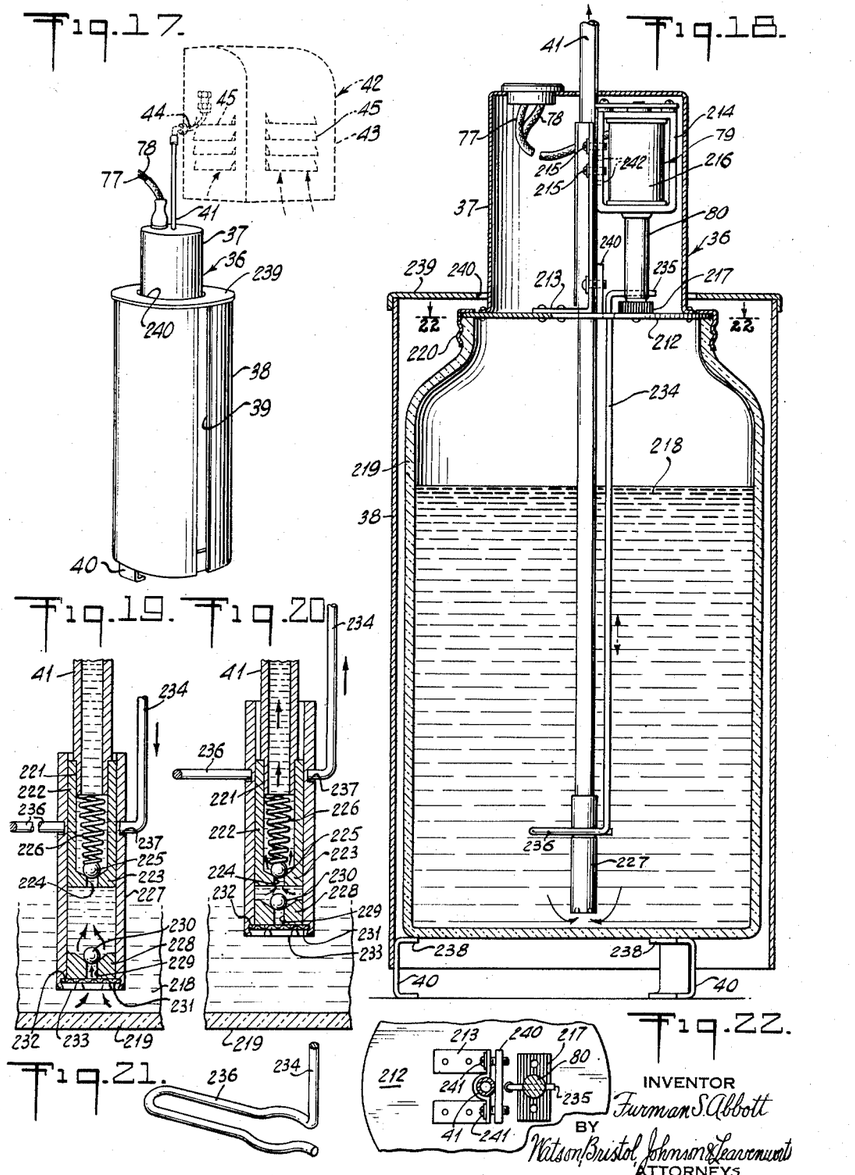
Fig. 17 is an elevational perspective of a third unit of the embodiment shown in Fig. 1, with the fourth unit thereof indicated in dotted lines to exemplify its association with the third unit shown in full lines.
Fig. 18 is an enlarged elevational section of the third unit shown in full lines in Fig. 17, and with parts broken away.
Fig. 19 is an enlarged elevational section to a still larger scale showing the details of construction of certain pump mechanism in Fig. 18, with the parts of such pump mechanism positioned for a pumping stroke.
Fig. 20 is a view similar to Fig. 19 of the structure shown therein but with the parts thereof in different positions as assumed after a pumping stroke.
Fig. 21 is a fragmentary elevational perspective, with parts broken away, of an operating element of the pump structure shown in Figs. 19 and 20.
Fig. 22 is a sectional view, with parts broken away, taken substantially on line 22—22 of Fig. 18.

In many cases it is desirable to adjust the stroke of the pump so as to assure delivery of a certain predetermined amount of liquid on each pump stroke, and also to adapt the pump to supply containers of different sizes. For this purpose it is preferable to provide for support bracket 213 separate means for clamping the discharge tube 41 thereto and mounting the solenoid supporting bracket 214 thereon. Accordingly, the discharge tube 41 may be clamped to the mounting bracket 213 by means of a plate 240 fastened to the bracket by screws 241, 241, as shown in Figs. 18 and 22. This means may thus be employed to adjust the vertical position of the discharge tube 41 irrespective of the solenoid mount and so that the bottom end of the discharge tube, where the working parts of the pump are located, may be positioned substantially at the bottom of the container 219 for most effective withdrawal of substantially all of the liquid therein.

Further, adjustment of the stroke of the pump, to vary the volume of discharge, may be readily attained with provision of sets of holes in the solenoid bracket 214 in addition to those in which the mounting screws 215, 215 are shown engaged. For example, another set of holes 242, 242 may be provided so that with screws 215, 215 engaged therein the solenoid will be lowered to permit a shorter stroke of the pump between the lowered position, with the bottom end of plunger core 80 resting on the bumper 217, and the upward position of the core when the solenoid is energized. Of course it will be understood that the mounting of solenoid bracket 214 is in one respect similar to that of the clamp bracket 240 with the screws 215, 215, the holes in the bracket in which they are engaged and the additional set of holes 242, 242, duplicated on the far side of supporting bracket 213 and the discharge tube 41 as the structure is viewed in Fig. 18. Further variation in the stroke of the pump may be obtained by providing bumper blocks at 217 of different heights.

In operation of the pump unit shown in Figs. 17 to 22, inclusive, when wires 77 and 78 are connected to a power input circuit having a circuit-closing switch therein, the pump may be caused to operate one stroke by closure of the switch to deliver a single pulse of liquid.

With closure of the switch the winding 216 of the solenoid 79 is energized so that the core plunger 80 is quickly pulled upwardly. The pump operating rod or pull wire 234 is lifted with the plunger core 80 so as to lift the pump cylinder sleeve 227. With the pump primed, as shown in Fig. 19, lifting of the cylinder sleeve 227 will develop increased pressure in the cylinder below the piston 222, since the valve ball 230 closes off the inlet passage 229. Eventually this internal pressure becomes greater than the biasing force of spring 226 and valve ball 225 is forced upwardly to open piston passage 224. When the internal pressure in the cylinder sleeve 227 is relieved by this upward passage of liquid, the biasing force of spring 226 re-seats valve ball 225 and the pump parts assume the relative positions shown in Fig. 20. The liquid in the cylinder sleeve 227 then passes upwardly through the hollow piston 222 into and through the outlet tube 41 in the form of a spurt or pulse thereof. When the solenoid is de-energized by breaking the power supply circuit of its winding, force of gravity pulls plunger core 80, operating rod 234 and pump cylinder sleeve 227 downwardly back to their relative starting position shown in Figs. 18 and 19. The pump parts will then be in their initial positions ready for another stroke.

This pump may be employed successfully to deliver spurts or pulses of liquid, such as a deodorant or air freshening liquid, to any suitable diffusing means, such as a vaporizer structure indicated in dotted lines in Fig. 17. For example, such a vaporizer structure may comprise a hood 43 having louvered inlet openings 45—45 and an outlet opening in the back side thereof through which air currents may be drawn to pick up vapors of the liquid pumped to the vaporizer. For this purpose the outlet tube 41 of the pump may be connected by a conduit 44 to any suitable spray head located within the vaporizer casing or hood 43.

The vaporizing unit 42 is shown in Figs. 23 to 28, inclusive, and is adapted for installation in air conditioning systems by attachment to the fan section thereof or to any other type of means for forcibly circulating air. Of course it is understood that provision may be made for passing air in either direction through the hood 43 of the vaporizing unit 42, so long as there are thereby created currents of air past a liquid delivery structure therein so that vapor from the liquid may be picked up by the passing currents. The embodiment shown in Figs. 23 to 28, inclusive, is particularly adapted for passage of air currents into the hood or casing 43 through louvered openings 45—45 in the two side panels 243, 243 thereof and a hinged door 244, closing an opening 245 in front panel 246 thereof. The hood has a top 247 curved at the front to merge with the front panel 246, a back panel 248 and a bottom 249. In the back panel 248 is preferably provided an outlet opening 250 so that air may be drawn therethrough to create currents up through the hood from the inlet louvered openings at 45—45.

The hood 43 preferably is provided with means for supporting a cartridge 251 of loosely packed material therein for purposes of most effectively dispensing vapors into passing air currents. For this purpose the hinged door 244 preferably supports on the inside thereof a pair of clips 252, 252, each having laterally extending lugs 253 on which the bottom edge of cylindrical cartridge 251 is adapted to rest when snapped into position between the two clips. The cartridge 251 may comprise a cylindrical casing 254 in which is loosely packed a mass 255 of pieces of suitable material which, for example, may be wood excelsior. The hood 43 is internally provided with a laterally extending partition 256 below the outlet opening 250 and that partition has therein a circular hole 257 with which the cylindrical casing 254 of cartridge 251 is to be substantially axially aligned, when the latter is held in close proximity to the partition, by clips 252, 252 with the door 244 closed, as is indicated by dotted lines in Figs. 25 and 26.

Figures 23, 24, 25, 26, 27, 28:
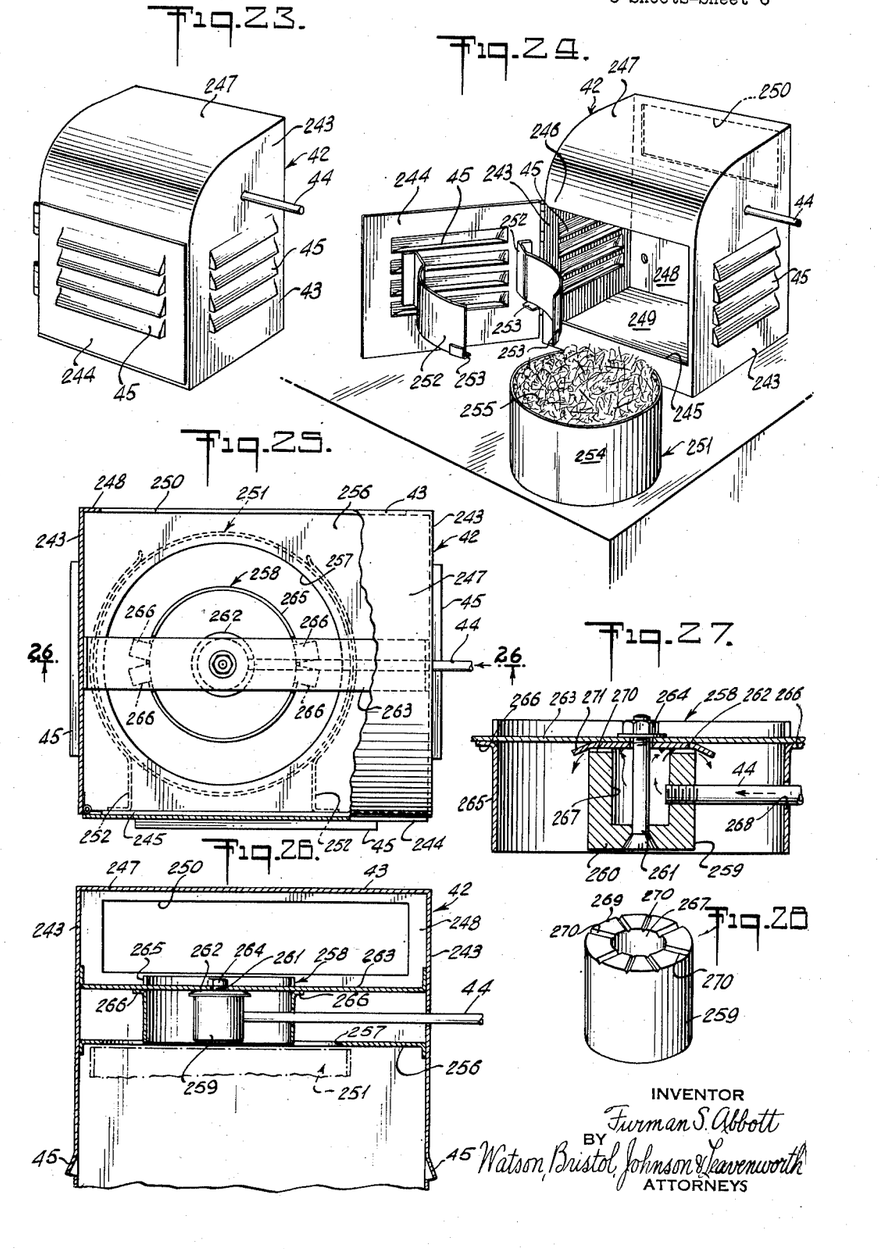
Fig. 23 is an elevational perspective of a modification of the fourth unit shown in Fig. 1, which is also indicated in dotted lines in Fig. 17, the casing thereof being shown in closed position.
Fig. 24 is an elevational perspective of the unit shown in Fig. 23 with the casing shown open and a diffusing cartridge thereof shown removed.
Fig. 25 is an enlarged top plan view, with parts broken away and in section, of the unit shown in Fig. 23.
Fig. 26 is an elevational section taken substantially on line 26—26 of Fig. 25, with parts broken away.
Fig. 27 is an elevational section on an enlarged scale of the spray head structure shown partly in elevation and partly in section in Fig. 26.
Fig. 28 is an elevational perspective of an element of the structure shown in Fig. 27.

The vaporizer hood 43 is suitably equipped with a dispensing nozzle or spray head unit 258 which, as will be seen from Figs. 25 to 28, inclusive, preferably comprises a cylindrical cup-shaped member 259 having a bottom 260 which is apertured to receive therethrough a headed bolt 261 having its upper end projecting through a hole in a cover plate 262 and a supporting bracket 263 with a nut 264 holding the parts together and on the supporting bracket. The supporting bracket 263 may be a transversely extending strap, as shown in Figs. 25 and 26, having its ends secured to the side walls 243, 243 of the hood. A cylindrical shield or spatter ring 265 is supported in any suitable manner about the spray head 259 and may, for this purpose, have diametrically opposed slots with lips 266—266 bent outwardly therefrom and spot-welded to the underside of the supporting strap 263.

The cup-shaped head 259 and cover plate 262 together provide a chamber 267 with which communicates an inlet conduit 44 threadably received in a hole in the side of the head and with that conduit extending through a hole 268 in the side of the shield or spatter ring 265. The upper edge 269 of spray head 259 is preferably provided with a plurality of radially extending grooves 270—270 so that, when the cover plate 262 is seated against the top edge, the grooves provide desirable small outlet passages to break up into a spray liquid which passes out therethrough from chamber 267 when delivered to the latter under pressure by inlet conduit 44. The spray emitting from passages provided by grooves 270—270 preferably is diverted downwardly by the turned down edge 271 of cover plate 262, whereby the latter serves as a baffle to assure impingement of the sprays somewhat medially of the inner wall of shield or ring 265 and down toward the cartridge 251 therebeneath.

In operation of the vaporizing unit 42 pulses or spurts of liquid will be delivered by any suitable pumping means through inlet conduit 44 to the chamber 267. The liquid under pressure in the latter will be delivered as a plurality of sprays through passages provided by grooves 270—270 to be diverted downwardly by the turned down edge 271 of baffle cover plate 262. The shield or ring 265 assures that substantially all liquid delivered in the form of a spray from the spray head 259 will pass down through hole 257 into the loose mass 255 in cartridge 251. When suction is applied to outlet hole 250 in the back panel 248 of the hood, air currents will be drawn through louvered openings at 45—45 up through cartridge 251 there to pick up vapors of the liquid sprayed into the mass. As the liquid is sprayed down into the excelsior mass 255 it is brought into intimate contact with the upwardly passing air to assure efficient diffusion of vapors into the air. With proper care a density of the packed mass of excelsior 255 may be attained which permits sufficient passage of air therethrough while retarding downward passage of the liquid, so as to avoid wasteful dripping. If, however, the rate of delivery of the liquid to the vaporizing cartridge 251 should happen to be more rapid than the rate at which it can be converted to vapor and picked up as such by upwardly passing currents of air, any consequential dripping may be efficiently collected in the bottom 249 of the hood 43 which together with side walls 243, 243, a bottom portion of front wall 246, and back wall 248, forms a collecting pan. This pan may be suitably connected to a discharge pipe which may conduct the excess liquid back to supply, if desired.

In operation of a typical embodiment of the apparatus of the present invention, the various units therof may be so installed and operated as to deliver into an air conditioning system an air-freshening, or deodorizing, or disinfecting, liquid, etc. For this purpose a hole may be formed in the wall of the plenum chamber of the air conditioning system and the hood 43 of the vaporizing unit 42 mounted on that wall with its outlet opening 250 communicating with the hole formed in the plenum chamber wall. Accordingly, a differential in pressure between the area outside the plenum chamber to which, for example, interior air of a building may travel or is supplied, and the area inside the plenum chamber is such as to draw air currents through the louvered openings at 45—45 in the vaporizing unit hood up through the cartridge 251, past spray head unit 258 up and through the outlet opening 250 leading into the plenum chamber.

With the supply container 219 of the pump unit 36 provided with a body 218 of the selected liquid, any time the circuit of pump solenoid 79 is closed its plunger core 80 quickly draws upwardly the pump cylinder sleeve 227 to cause liquid therein to pass check valve 225 up through pump discharge tube 41 to inlet conduit 44 of the vaporizing unit 42. As a result, a pulse or spurt of the liquid will be supplied to the spray head unit 258 so as to spray into upwardly passing currents tiny droplets of the liquid and also to wet the mass 255 of excelsior, or the like, in the cartridge 251 so that upwardly passing currents of air may, as they pass through the cartridge, also pick up vapors of the liquid. This will effectively deliver into the air circulated in the air conditioning system, vapors of the liquid which may be of an air-freshening nature.

The rate of delivery of the liquid into the air drawn into the air conditioning system through the vaporizing unit 42 is subject to precise control by means of the regulator unit 34. The control knob 35 of the latter may be manually set at ony one of a number of points where any number between one (1) and eight (8) control circuit closures per predetermined period may be had. For example, in a five (5) minute period the synchronous clock motor 91 in the regulator unit 34 may close the control circuit of power center unit 30 from one (1) to eight (8) times during that period. Each time the control circuit is closed a relay therein, comprising solenoid 74 and mercury switch 66, closes the circuit of pump solenoid 79 so that the latter will cause the pump to make one stroke to deliver a pulse of spurt of liquid to the vaporizing unit. The manual control knob 35 operates a cutout switch mechanism 107 to accomplish a selective number of times the control circuit is closed per a predetermined period.

In order to assure that each circuit closure by synchronous clock motor-operated mechanism will not be of a duration to deleteriously affect or overheat the pump operating solenoid 79, the relay mercury switch 66 in the circuit of the latter is equipped with the mechanical timing mechanism of Figs. 4 to 9, inclusive, so that if in any thirty-seven and a half (37.5) second interval of the five (5) minute period the synchronous motor-operated switch mechanism holds the control circuit closed for a period of, say, ten (10) seconds, that control switch may be caused to operate relay solenoid 74 which in turn through the mechanical timing mechanism, herein above described, causes closure of the circuit of the pump solenoid 79 at the mercury switch 66 for a much shorter period, say, two (2) seconds, which is long enough to cause the pump efficiently to make one stroke but short enough to avoid overheating of the pump solenoid 79.

The apparatus of the present invention and the various units thereof have been efficiently employed in so delivering vapors of air-freshening liquid into the air circulated in air conditioning systems but, of course, it is equally well adapted for similar delivery of different types of liquids into any gaseous medium circulated in any suitable manner through the vaporizing unit.

In the embodiment shown by way of example in the accompanying drawings the make-and-break switch device in the power circuit of the pump-operating solenoid is a relay having its contacts connected in that power circuit and its winding connected in a control circuit. Driven adjustable means are provided in the control circuit in the form of a switch device, and a motor-operated drive preferably drives that adjustable switch means at a substantially constant speed to make or close and break or open the power circuit a certain number of times in a predetermined period of time with periodic energization and de-energization of the relay. A manual control is provided for the adjustable means so that the latter can be set selectively to close and open the relay control circuit one or more times, e. g., from one (1) to eight (8) times in a predetermined period, such as during five (5) minutes. Of course it will be understood that within the scope of the invention mechanical motor driven switch means may be substituted for the relay and control circuit so that contacts thereof will, when connected in the power circuit, close and open the latter a certain number of times in a predetermined period. In such case the motor driven switch means is made adjustable so that the number of makes and breaks of the power circuit in a predetermined period can be selectively changed at will by a manual control. The latter embodiment will be more fully disclosed and claimed in a co-pending applicatin. Timer means are preferably associated with the relay to determine duration of closure of the power circuit as a noise minimizing and safety feature and so that overheating of the pump-operating solenoid is avoided without imposing rigid limitations on design and operation of other units of the system of the present invention and parts thereof.

Such timer means may comprise purely mechanical means as illustrated above, or may comprise certain other means such as a warp switch having a thermally responsive bimetallic blade carrying a heating coil and a common contact for a single pole, double-throw switch, with one side of the latter normally closing a portion of the relay winding circuit and shunted by a mercury tube switch and resistor in series so that the resulting shunt circuit will serve for a time as a lock-up connection for the relay winding when the normally closed side of the warp switch is opened by heat response. The relay armature may be adapted to tilt a carriage on which can be supported two (2) mercury tube switches with one serving to close the pump solenoid circuit and the circuit of the warp switch heating coil connected in parallel with the winding of the pump solenoid, and the other mercury tube switch serving to close that resistor lock-up connection for the relay winding in such a way as to short out the relay winding and its series regulator switch when, after a predetermined time interval, the normally open side of the warp switch is closed by heat response.

Various features of units, or parts thereof, of the herein claimed system, in and of themselves, represent developments being claimed in companion applications; the electrical contact device of Figs. 15 and 16 being the subject matter of claims of the application of Frank E. Pendleton, S. N. 715,536, filed November 22, 1946, now abandoned; the pump structure of Figs. 17 to 22 inclusive, being the subject matter of claims of applicant's application S. N. 709,450, filed November 13, 1946, and the vaporizer device of Figs. 23 to 28 inclusive, being the subject matter of claims of applicant's application S. N. 709,449, filed November 13, 1946, now Patent No. 2,474,565, dated June 28, 1949.

It will thus be seen that the objects set forth above, among others made apparent from the preceding description, are efficiently attained and, since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In a controlled power operated liquid pumping device the combination comprising, pulsating pump means to deliver successive pulses of liquid, a solenoid to operate said pump and having a winding, a power source, a power circuit connected to said power source and including said solenoid winding, a control circuit connected to said power source in parallel with said power circuit, a relay having its winding connected in said control circuit and make-and-break switch contacts connected in said power circuit in series with said solenoid winding, a regulator having a plurality of fixed contacts connected in parallel branches of one side of said control circuit and a motor-driven contact connected to the other side of said control circuit for successively contacting said fixed contacts in a predetermined period of time, a plurality of switches in said parallel branches of said control circuit, and a manual control for selectively opening and closing said parallel branch switches to alter at will the number of control circuit closures and breaks in the predetermined period.

2. In a controlled power operated liquid pumping device the combination comprising, pulsating pump means to deliver successive pulses of liquid, electrical pump-driving means to cause said pump to deliver a pulse of liquid each time said electrical means is energized, an electrical power circuit for energizing said electrical means, a control circuit, a relay in said control circuit having make-and-break switch contacts in said power circuit, timer means associated with said relay to determine duration of make of the contacts thereof, driven adjustable switch means in said control circuit to determine the number of times said relay closes said power circuit during a predetermined period of time, motor operated means to drive said adjustable switch means, and a manual control for selectively adjusting said adjustable switch means.

3. In a controlled power operated liquid pumping device the combination comprising, pulsating pump means to deliver successive pulses of liquid, a solenoid to operate said pump and having a winding, a power source, a power circuit connected to said power source and including said solenoid winding, a control circuit connected to said power source in parallel with said power circuit, a relay having its winding connected in said control circuit and make-and-break switch contacts connected in said power circuit in series with said solenoid winding, timer means associated with said relay winding to respond to flow of current through the latter with physical movement to close said contacts and automatically to open the latter after a predetermined duration of closure, a regulator having a plurality of fixed contacts connected in parallel branches of one side of said control circuit and a motor-driven contact connected to the other side of said control circuit for successively contacting said fixed contacts in a predetermined period of time, a plurality of switches in said parallel branches of said control circuit, and a manual control for selectively opening and closing said parallel branch switches to alter at will the number of control circuit closures and breaks in the predetermined period.

4. In a controlled power operated liquid pumping device the combination comprising, pulsating pump means to deliver successive pulses of liquid, a solenoid to operate said pump and having a winding, a power source comprising a step-down transformer, a power circuit connected to the secondary winding of said step-down transformer and including said solenoid winding, a control circuit connected to said secondary winding in parallel with said power circuit, a relay having its winding connected in said control circuit and make-and-break switch contacts connected in said power circuit in series with said solenoid winding, timer means associated with said relay winding to respond to flow of current through the latter with physical movement to close said contacts and automatically to open the latter after a predetermined duration of closure, a regulator having a plurality of fixed contacts connected in parallel branches of one side of said control circuit and a movable contact connected to the other side of said control circuit for successively contacting said fixed contacts in a predetermined period of time, an electrical motor for driving said control circuit movable contact, a motor circuit including said motor and connected through a step-up transformer to said secondary winding of said step-down transformer, a plurality of switches in said parallel branches of said control circuit, and a manual control for selectively opening and closing said parallel branch switches to alter at will the number of control circuit closures and breaks in the predetermined period.

5. In a controlled power operated liquid pumping device the combination comprising, pulsating pump means to deliver successive pulses of liquid, electrical pump-driving means to cause said pump to deliver a pulse of liquid each time said electrical means is energized, an A.-C. electrical power circuit for energizing said electrical means, a make-and-break switch device in said circuit, timer control means for said switch device including a synchronously-driven rotary means to effect periodic switch operation during its rotation when its driving synchronous motor is connected to said circuit, adjustable rotatable means periodically to disable switch-operating action of said rotary means between predetermined minimum and maximum numbers of makes and breaks in a predetermined period of time, and a manual control for selectively rotating said adjustable means between a plurality of predetermined settings each dictating a different number of operations of said switch device during said predetermined period of time.

FURMAN S. ABBOTT.

REFERENCES CITED

The following references are of record in the file of this patent:

UNITED STATES PATENTS

| Number | Name | Date |
|---|---|---|
| 238,977 | Sisson | Mar. 15, 1881 |
| 496,331 | Van Depoele | Apr. 25, 1893 |
| 1,672,701 | Vauclain et al. | June 5, 1928 |
| 2,100,454 | Schroeder | Nov. 30, 1937 |
| 2,254,432 | Lieberman | Sept. 2, 1942 |
| 2,293,684 | Holthouse | Aug. 18, 1942 |
| 2,296,034 | Hemming et al. | Sept. 15, 1942 |
| 2,317,166 | Abrams | Apr. 20, 1943 |
| 2,382,426 | Kocher | Aug. 14, 1945 |
| 2,416,843 | Parsons | Mar. 4, 1947 |
| 2,430,758 | Crise | Nov. 11, 1947 |